United States Patent Office 3,176,497
Patented Apr. 6, 1965

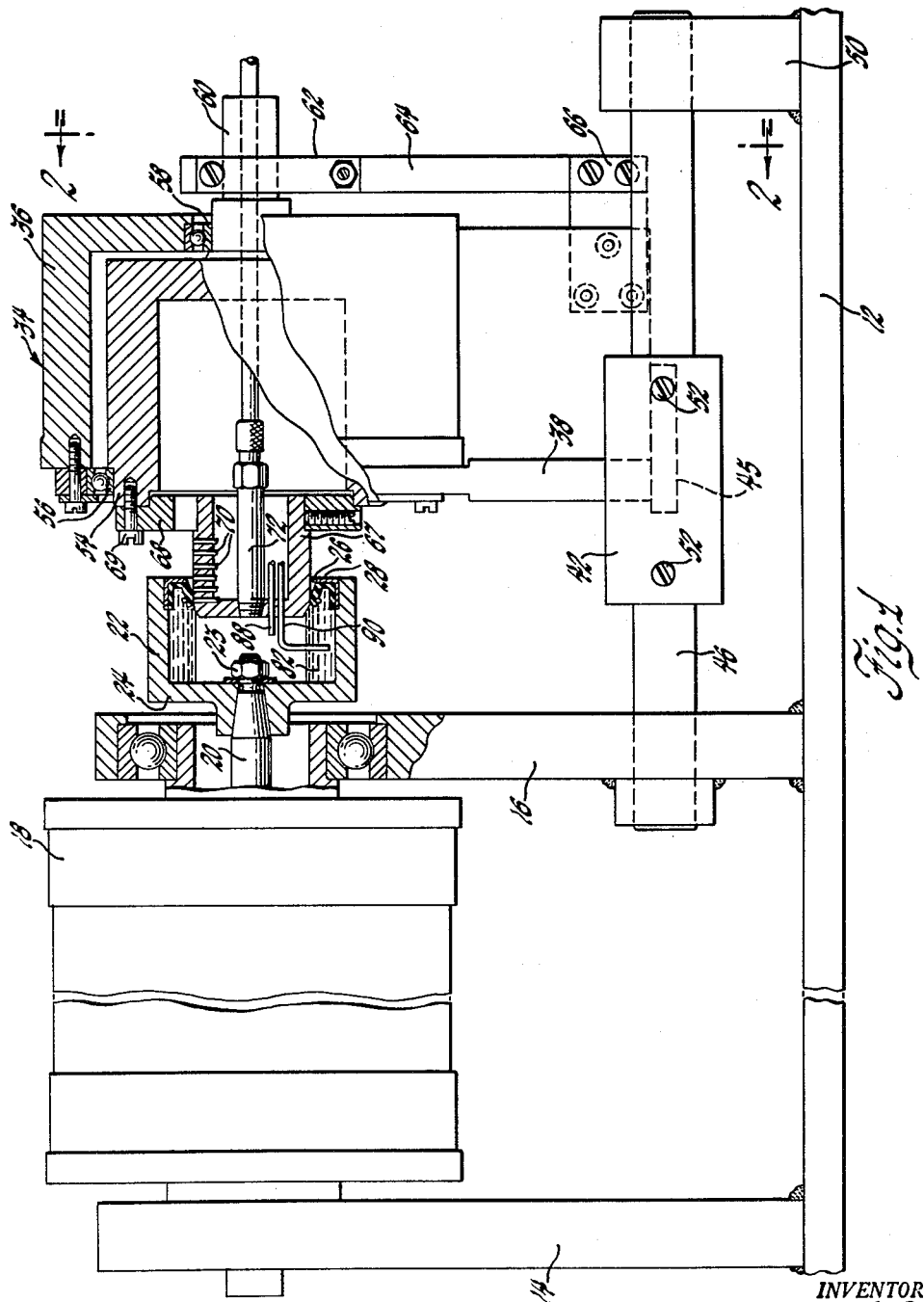

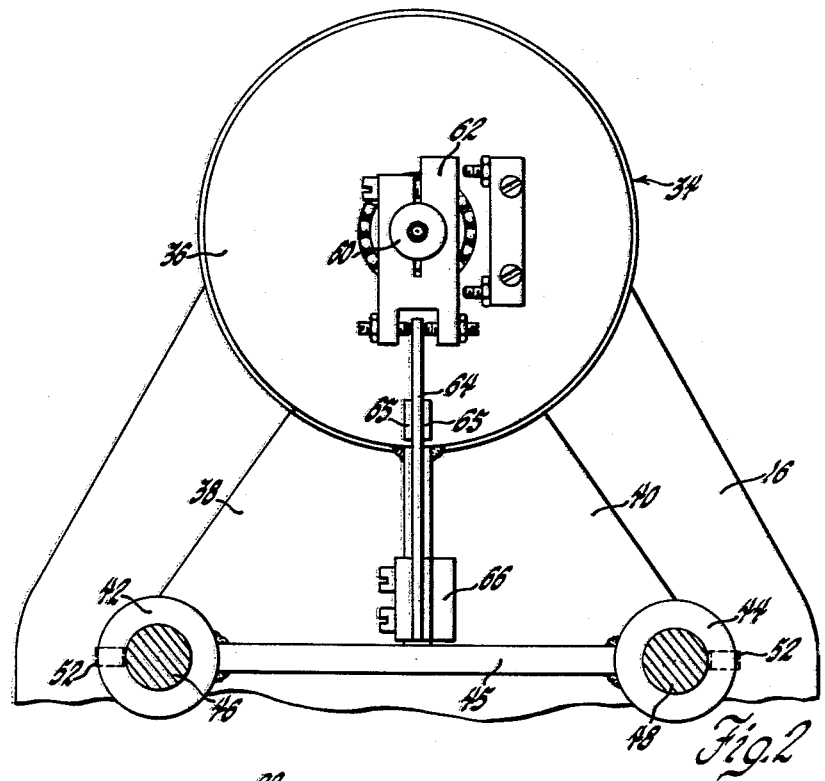
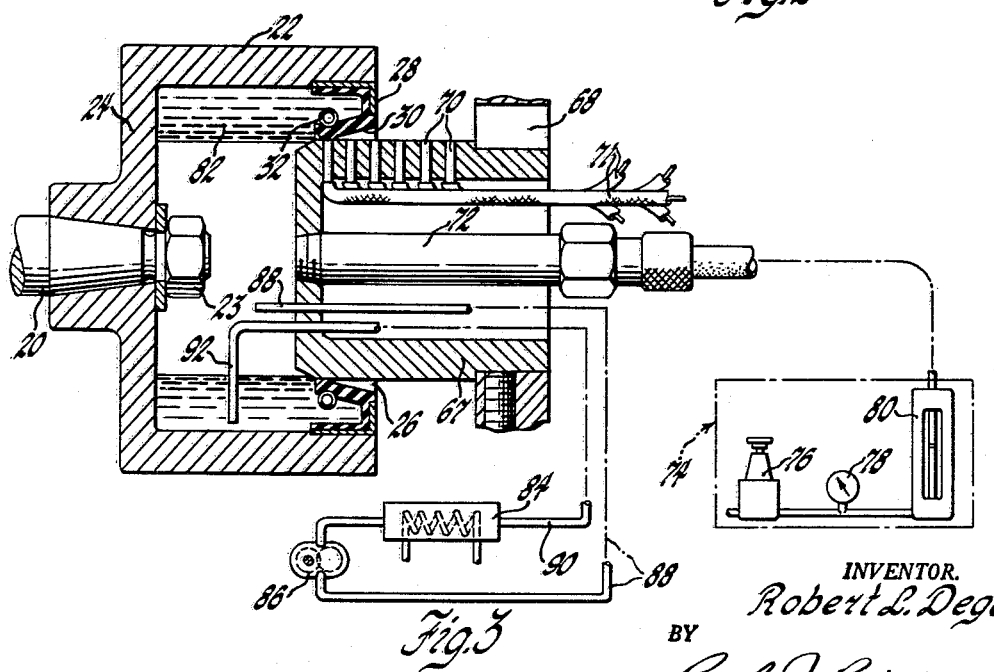

3,176,497
METHOD AND APPARATUS FOR DETERMINING SEAL TEMPERATURES AND SHAFT TORQUE
Robert L. Dega, Utica, Mich., assignor to General Motors Corporation, Detroit, Mich., a corporation of Delaware
Filed Aug. 25, 1961, Ser. No. 133,847
9 Claims. (Cl. 73—9)

This invention relates to a method and apparatus for testing annular seals of the type used on rotating shafts such as drive shafts.

It is well known that shaft seal failures are principally due to inability of the seal to withstand high shaft temperatures as can be generated by the frictional rubbing contact between the shaft and the seal, or inability to withstand the wear and stresses caused by high shaft torques. Therefore, it is important that there be means to determine the ability of a particular seal to withstand various shaft temperatures and torques so that conditions under which the seal may be effectively utilized can be known.

It is an object of this invention to provide a method and apparatus for testing seal units prior to their assembly and use with a shaft so that it may be ascertainable whether satisfactory sealing ability is retained under various operating conditions.

More specifically, it is an object to provide a testing apparatus that can simulate conditions experienced by seals and provide information relating to oil seal running torque, absorbed horsepower and seal lip inner face temperatures.

Another object is to provide a seal testing method and apparatus that is capable of measuring the temperature of the seal inner face during the rotation of the seal about a shaft at a predetermined speed.

A further object of this invention is to provide a seal testing method and apparatus that can measure the amount of torque to which a seal is subjected during the rotation of the seal about a shaft at a predetermined speed.

A still further object of this invention is to provide a method and apparatus for testing seal units that can simultaneously measure the running torque and the inner face temperature of a seal during the rotation of the seal about a shaft at a predetermined speed.

Another object of this invention is to provide a seal testing method and apparatus that maintains oil at a constant temperature in contact with the seal.

Another object of this invention is to provide a seal testing method and apparatus that rotates the seal around a test shaft and maintains the seal inner face in surface engagement with the shaft irrespective of the speed at which the seal is rotated.

In general, the testing apparatus includes a base which supports a variable speed motor and a test shaft assembly, a seal retainer being mounted on the motor shaft in a manner that permits the seal to be rotated at various predetermined speeds about a shaft incorporated with the test shaft assembly. The shaft has several thermocouples embedded in the surface thereof for sensing seal lip inner face temperatures. In addition, a nozzle is provided in the shaft for directing a fluid under pressure into the seal retainer to counteract the centrifugal forces that tend to cause a separation of the rotating seal lip from the surface of the shaft. Also, means are incorporated with the shaft for circulating an oil at a predetermined temperature into and out of the seal retainer. The shaft is pivotally carried by a fixed housing and is associated with a strain beam that includes a gauge for measuring the amount of torque to which the seal is subjected.

Further objects and features of the present invention will be more readily ascertainable from a perusal of the following description of a preferred embodiment made with reference to the accompanying drawings in which:

FIGURE 1 is an elevation view, partly in section, of the test apparatus constructed in accordance with the invention;

FIGURE 2 is an end view taken on lines 2—2 of FIGURE 1; and

FIGURE 3 is an enlarged view of the test shaft and the seal retaining housing portions of the apparatus shown in FIGURES 1 and 2.

Referring to the drawings, the testing apparatus comprises a base plate 12 having a pair of upright members 14 and 16 that serve to support a variable speed motor 18; a dynamometer may be coupled with the motor to indicate the horsepower requirements on it. The motor 18 includes a shaft 20 that has a cup-shaped seal retainer 22 fixed to the end of the shaft by a nut 23. The seal retainer has a closed end 24 and an open end 26 that is adapted to house a test seal 28 that is press fitted into rigid engagement with the inner surface of the retainer. The seal 28 is of the conventional flexible lip type and includes a radially inwardly extending lip portion 30 on which a garter spring 32 is mounted.

A test shaft assembly, generally indicated by the numeral 34, is positioned adjacent the motor and in axial alignment therewith. The test shaft assembly 34 comprises a cup-shaped housing 36 that is connected by web portions 38 and 40 to spaced cylindrical sleeve members 42 and 44, respectively, that are laterally disposed on opposite sides of the assembly axis. A transversely extending plate 45 is welded between the sleeve members and together with the web portions forms a rigid support for the housing 36. The cylindrical sleeve members are slidably mounted on guide bars 46 and 48 that are horizontally supported between the motor support 16 and a guide bar support 50. A plurality of set screws 52 are carried by the sleeve members for fixing the test assembly in a desired position between the supports of the guide bars.

A test shaft support housing 54, of a shape similar to that of the outer housing 36, is concentrically mounted within the latter and is positioned within the housing 36 by a pair of ball bearings 56 and 58 that provide an antifriction support for the housing 54 on its longitudinal axis. A shaft 60 that is rigidly connected to the housing 54 extends axially from one end thereof beyond the housing 36. As best viewed in FIGURE 2, a portion of the shaft 60 is combined with a conventional strain gauge arrangement for determining the running torque of the seal and includes a shaft clamp 62 that is rigid with the shaft and is associated with a strain beam 64. The strain beam is fixed to the plate 45 by bracket 66 and includes a pair of strain gauge elements 65 that respond to the bending stress in the beam caused by the angular deflection of the shaft 60.

A test shaft 67 is rigidly connected by a disc-shaped member 68 to the open end of the test shaft support housing 54 by a plurality of screws, one of which is indicated by the numeral 69. As best shown in FIGURE 3, the test shaft 67 has a plurality of thermocouples 70 embedded therein that extend to the surface of the test shaft and are equally spaced from each other along the longitudinal axis of the shaft. Each of the thermocouples 70 is connected by an appropriate lead 71 to a suitable instrument for indicating the temperature of the test shaft 67 as measured at the several points by the thermocouples. In addition, the test shaft 67 includes a nozzle 72, one end of which is threaded in the test shaft with the other end leading to an air control system 74. The control system 74 serves to direct compressed air through the nozzle 72 into the seal retainer 22 and includes a pressure regulator 76, a pressure gauge 78, and an air flow meter 80 for controlling the amount of pressure within the seal retainer. The air flow meter is inoperative during the actual test as will soon appear. Oil at a predetermined temperature can be directed into and out of the seal retainer for covering the seal with a column of oil 82, as shown in FIGURES 1 and 3. This is accomplished by providing a system having a heat exchanger 84 and a pump 86, both of which are included in an oil circuit that has an oil emitting line 88 and an oil return line 90 projecting through the shaft 67 into the seal retainer. As best seen in FIGURE 3, the oil emitting line 88 is located adjacent the air nozzle 72 while the oil return line is positioned below with an extension 92 having it send adjacent the inner surface of the seal retainer. The purpose of the latter is to assure that substantially all of the oil is removed from the retainer.

The operation of the seal testing apparatus is as follows: Initially the test seal unit 28 is installed in the retainer 22 reverse to the normal test position shown; that is, the seal is installed with its open end facing outwardly and hence with the garter spring 32 exposed. The reason for this installation is that due to the rotation of the seal retainer 22 a centrifugal force develops that causes the lip 30 and garter spring 32 to decrease the lip pressure. To determine the amount of pressure required to counteract this centrifugal force, the seal is installed in reverse, and as the seal is rotated at various speed increments, the lip pressure is indicated by the air flow meter 80 as a controlled leakage of air passed the seal lip occurs. Subsequently, during the test running of the seal in its normal position shown, the previously indicator decrease in lip pressure relative to speed can be used as a measure for the amount of back pressure which should be applied by way of the air nozzle to counteract the effect of centrifugal force on the lip.

After ascertaining the amount of back pressure required to maintain lip contact during different speeds, the seal 28 is then installed as shown in FIGURE 3. At this time the test assembly 34 is moved in an axial direction along the guide bars 46 and 48 so as to position the test shaft 67 in surface engagement with the rubbing lip 30 of the seal 28. For best results the rubbing lip 30 should be positioned in contact with one of the thermocouples 70, therefore the temperature obtained is that of the lip directly as well as the local shaft surface temperature. The other thermocouples indicate the heat gradient in the shaft at equal distances away from the lip. The motor 18 is then energized causing a rotation of the seal retainer 22 and the seal 28 about the test shaft 67. As an example, a test procedure can consist of running the seal at 500 r.p.m. increments through a range of 0–3500 r.p.m. The motor is brought up to the desired speed whereupon sufficient oil to completely cover the seal is then directed into the closed seal retainer 22 via the oil line 88. Compressed air is then supplied to the retainer via the nozzle 72 with the amount of pressure admitted into the seal retainer 22, of course, being determined by the speed of the rotating seal retainer.

Pressurization of the oil 82 with an air column is controlled by the regulator 76 and gauge 78 shown in the system 74. The oil is piped in through the line 88 and out of the seal retainer 22 through the line 90 and circulated through a water to oil heat exchanger 84. By this method very precise control of oil temperatures can be mtaintained and also the height of the column of oil can be controlled so that there is no centrifugal effect of the oil column on the seal lip.

When the desired speed of the seal retainer 22 is attained, measurements of the shaft temperature as sensed by the several thermocouples 70 are recorded together with the amount of running torque experienced by the seal 28. As to the latter, it should be noted that the test shaft 67 is rigidly mounted to the test shaft support housing 54 which in turn is supported on the bearings 56 and 58. Because of this anti-friction support arrangement, any angular deflection of the test shaft 67 caused by the rubbing contact of the lip 30 is almost entirely due to the frictional torque of the seal and is sensed by the strain gauge 65 which in turn is connected to a conventional torque recorder.

From the above it should be appreciated that the subject invention is capable of simulating various operating conditions that could be experienced by a seal after installation. In addition, it can be seen that the seal rubbing lip 30 can be poistioned at different points along the test shaft 67 and is not necessarily restricted to the arrangement shown in the drawings.

It will be understood that the drawings and description are merely illustrative of and not restrictive of the nature and scope of the invention and show merely an illustrative embodiment thereof. Accordingly, the appended claims are to be construed as covering various changes in design, structure and arrangement such as may be utilized by those skilled in the art.

I claim:
1. A method for measuring the running torque and the temperature developed between the rubbing lip of an annular seal and the peripheral surface of a shaft comprising the steps of fixedly mounting the seal in the open end of cup-shaped housing, inserting a cylindrical shaft into peripheral engagement with the rubbing lip of the seal so as to sealingly close said housing, rotating said housing with said seal at a predetermined speed about said shaft, introducing a fluid into the closed housing at a predetermined pressure according to the rotational speed of the housing to counteract centrifugal forces acting on the lip, the pressure being sufficient to maintain said lip in sealing engagement with said shaft during the rotation of the seal, and measuring the temperature of the lip at a line on the shaft surface in contact with the seal lip and indicating the torsional friction between the lip and shaft by the amount of angular deflection of the shaft.

2. Apparatus for measuring the running torque and the temperature developed between the rubbing lip of an annular seal and the peripheral surface of a shaft comprising a variable speed motor, a seal retaining housing connected to said motor for rotation thereby, said housing being cup-shaped with an open end for supporting the seal, support means for maintaining said shaft concentric within the seal, strain gauge means associated with said shaft for measuring the angular deflection about its axis, and a plurality of temperature sensing means carried on the surface of said shaft and equally spaced along the longitudinal axis thereof for measuring the seal and shaft temperature during the rotation of said seal.

3. The apparatus of claim 2 wherein said shaft includes means for directing pressurized fluid into said retaining housing for maintaining the rubbing lip of the seal in sealing engagement with said shaft during the rotation of the seal.

4. The apparatus of claim 2 wherein the shaft includes means for circulating an oil into and out of the retaining housing for maintaining a column of oil at a constant temperature in contact with the seal.

5. Apparatus for measuring the running torques and the temperatures developed between the rubbing lip of a radial oil seal and the peripheral surface of a shaft comprising; means for relatively rotating the seal and shaft at a predetermined speed, a thermocouple having a junction formed in the shaft surface for sensing the temperature of the seal lip and shaft along the line of lip contact during the relative rotation of the seal and shaft, and torque measuring means associated with the relatively rotating seal and shaft for indicating the amount of torsional friction developed between them during relative rotation.

6. The apparatus of claim 5 wherein the seal is rotated and the shaft is stationary and in addition comprising; a rotatable housing circumjacent the shaft for receiving the seal in peripheral lip engagement on the shaft so as to sealingly close the housing, and fluid introducing means associated with the housing for introducing fluid into the closed housing at a predetermined pressure according to the rotational speed thereof to counteract the centrifugal forces acting on the lip, the pressure being sufficient to maintain the lip in sealing engagement with the shaft during rotation.

7. The apparatus of claim 6 and in addition comprising, fluid lubricant circulating means associated with said housing for recirculating a lubricant into and out of the housing for lubricating the seal lip while being rotated, said means including heat exchanger means for regulating the temperature of the lubricant during the test.

8. Apparatus for measuring the running temperature developed between the rubbing lip of a radial oil seal and the peripheral surface of a shaft, comprising means for relatively rotating said seal and shaft at a predetermined speed, and a thermocouple having a junction embedded in the shaft surface for sensing the temperature of the seal lip and shaft at the line of lip contact during relative rotation of the seal and shaft.

9. The apparatus of claim 8 wherein a plurality of thermocouples are provided in the shaft surface and the junctions of the thermocouples are equally spaced along the longitudinal axis of said shaft.

References Cited in the file of this patent
UNITED STATES PATENTS

| | | |
|---|---|---|
| 2,486,280 | Hausmann | Oct. 25, 1949 |
| 2,972,881 | Koch | Feb. 28, 1961 |
| 3,041,867 | Knudsen | July 3, 1962 |